(12) United States Patent
Fossum et al.

(10) Patent No.: US 6,870,708 B1
(45) Date of Patent: Mar. 22, 2005

(54) WELD PADS FOR HEAD SUSPENSIONS

(75) Inventors: Randolph E. Fossum, Richfield, MN (US); Shane J. Van Sloun, Waconia, MN (US); Don J. Rydberg, Newton, IA (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 10/230,012

(22) Filed: Aug. 28, 2002

(51) Int. Cl.$^7$ .................................................. G11B 5/54

(52) U.S. Cl. .............................. 360/244.5; 360/245.2; 360/245.4; 360/265.9

(58) Field of Search ........................... 360/245.4, 244.5, 360/245.2, 265.9, 266

(56) References Cited

U.S. PATENT DOCUMENTS

| | | | |
|---|---|---|---|
| 3,665,434 A | 5/1972 | Applequist et al. ...... | 360/245.3 |
| 3,975,612 A | 8/1976 | Nakazaki et al. ...... | 219/121.14 |
| 4,783,710 A | 11/1988 | Salyer et al. ............ | 360/245.2 |

(List continued on next page.)

FOREIGN PATENT DOCUMENTS

| | | |
|---|---|---|
| JP | 9-293338 | 11/1997 |
| JP | 9-297972 | 11/1997 |
| JP | 9-320212 | 12/1998 |
| JP | 11-185404 | 7/1999 |
| JP | 2980176 | 9/1999 |
| JP | 11-306703 | 11/1999 |
| JP | 2001-028171 | 1/2001 |
| JP | P2001-176224 A | 6/2001 |
| WO | WO 99/48679 | 9/1999 |
| WO | WO 99/65020 | 12/1999 |

OTHER PUBLICATIONS

C–MN Weld Metallurgy, The Welding Institute, 5 pages http://home.istar.ca/¶bsant/WeldMet/CMn.html, downloaded Jul. 13, 2001.
High Energy Metals, Inc., Nov. 2001, 2 pages, http://www.highenergymetals.com, downloaded Nov. 25, 2001.
Ultrasonic Energy welds Copper to Aluminum, *Welding Journal,* Jan. 1997, 2 pages, http://www.amtechultrasonic.com/wj_01_97.html, downloaded Nov. 25, 2001.
TWI Ltd., Arc Weldability of Dissimilar Metals, Oct. 2000, http://www.twi.co.uk/j32k/protected/band_3/kspw002.html., downloaded Nov. 25, 2001.
F. M. Hosking et al., "Intermediate Temperature Joining of Dissimilar Metals/Stainless sleel and AG–Ni–AG laiminate are joined to copper with Au–based alloys at 400–550° C.", Welding Research Supplement, Apr. 1999, pp. 127–s through 136–s.
IBM, "Brazed Ceramic Comb for High Modulus Actuator", published Mar. 15, 1999, 1 page.

(List continued on next page.)

*Primary Examiner*—Jefferson Evans
(74) *Attorney, Agent, or Firm*—Faegre & Benson LLP

(57) ABSTRACT

Method and apparatus for providing a welded attachment between components for a disk drive head suspension where the material of at least one of the components is not suitable for welding directly to the material of the other component. The method and apparatus include providing at least one insert in an aperture in one component compatible with material of the second component or an insert in the second component to enable the first component to be welded to the second component. The insert may be an interference fit in the aperture or it may be coined to enhance retention. Fully hardened or annealed stainless steel may be used for the insert, and aluminum, ceramic or a polymer or composite may be the material receiving the insert. The aperture may be preformed or formed in by the insert during the operation of punching and installing the insert.

44 Claims, 12 Drawing Sheets

U.S. PATENT DOCUMENTS

| | | | |
|---|---|---|---|
| 4,786,999 A | | 11/1988 | Tanaka et al. ............ 360/245.2 |
| 4,949,194 A | | 8/1990 | MacPherson et al. .... 360/265.9 |
| 4,991,045 A | | 2/1991 | Oberg ...................... 360/244.3 |
| 5,107,641 A | * | 4/1992 | Davis ........................ 52/127.7 |
| 5,124,864 A | | 6/1992 | Matsuzaki ................ 360/244.4 |
| 5,475,549 A | | 12/1995 | Marder et al. ........... 360/265.8 |
| 5,621,590 A | | 4/1997 | Pace et al. ................ 360/244.6 |
| 5,627,701 A | | 5/1997 | Misso et al. .............. 360/265.8 |
| 5,677,815 A | | 10/1997 | Chan ........................ 360/265.7 |
| 5,711,063 A | | 1/1998 | Budde et al. ............. 29/603.06 |
| 5,715,117 A | * | 2/1998 | Brooks ..................... 360/244.5 |
| 5,724,211 A | | 3/1998 | Higashiya et al. ........ 360/244.4 |
| 5,796,554 A | | 8/1998 | Berding et al. ........... 360/244.8 |
| 5,835,308 A | | 11/1998 | Hasegawa ................. 360/265.7 |
| 5,835,311 A | | 11/1998 | Brooks, Jr. et al. ....... 360/265.9 |
| 5,840,135 A | | 11/1998 | Grant et al. ................ 148/405 |
| 5,844,750 A | | 12/1998 | Takaike .................... 360/244.4 |
| 5,896,246 A | | 4/1999 | Budde et al. ............. 360/244.4 |
| 5,896,646 A | | 4/1999 | Boutaghou et al. ....... 29/603.01 |
| 5,897,047 A | | 4/1999 | Takei et al. .................. 228/114 |
| 5,901,017 A | | 5/1999 | Sano et al. ............... 360/245.9 |
| 5,910,867 A | | 6/1999 | Takahashi ................. 369/13.17 |
| 5,930,083 A | | 7/1999 | Adley ...................... 360/244.5 |
| 5,956,211 A | | 9/1999 | Adley ...................... 360/244.1 |
| 5,966,269 A | | 10/1999 | Marek et al. ............. 360/244.3 |
| 5,978,178 A | | 11/1999 | Adley ...................... 360/244.4 |
| 6,042,658 A | | 3/2000 | Grensing et al. ........... 148/437 |
| 6,049,443 A | | 4/2000 | Grill et al. ................ 360/244.8 |
| 6,057,989 A | | 5/2000 | Kaczynski et al. ....... 360/265.7 |
| 6,087,620 A | | 7/2000 | Brooks, Jr. et al. ...... 219/121.64 |
| 6,091,578 A | | 7/2000 | Stole et al. ............... 360/265.9 |
| 6,151,198 A | | 11/2000 | Prater et al. .............. 360/265.7 |
| 6,410,081 B1 | * | 6/2002 | De La Prieta et al. ......... 427/96 |
| 6,634,085 B1 | * | 10/2003 | Schmidt et al. ........... 29/603.03 |
| 6,678,120 B2 | * | 1/2004 | Money ..................... 360/264.4 |
| 2003/0086206 A1 | * | 5/2003 | Kube et al. ............... 360/244.5 |

OTHER PUBLICATIONS

D.J. Perettie, "Swage process Compatible Suspension Attachment Methods for use with High Modulus Materials in Disk Drive Applications", Jun. 1998, 3 pages.

International Business Machines Corporation, "Stacked Actuator, High Stiffness, Adhesively Bonded", Sep. 1999, 1 page.

International Business Machines Corporation, "Overmolding of High Modulus Actuator Comb by Plastic Injection Molding", Dec. 1999, 2 pages.

International Business Machines Corporation, "Carbon Fiber Reinforced Metal Matrix or Polymer Composite E-block", Sep. 1999, 1 page.

"Faunhofer ILP—Laser Bean Micro Welding of Dissimilar Metals", http://www.ilt.fhg.de/eng/jb00-s38.html, downloaded Nov. 25, 2001, 1 page.

"Periodic Table—Iron", http://nikkinflux.com/26.htm, downloaded Nov. 25, 2001, 1 page.

"Periodic Table—Aluminum", http://nikkinflux.com/13.htm, downloaded Nov. 25, 2001, 1 page.

* cited by examiner

WELD PADS FOR HEAD SUSPENSIONS

FIELD OF THE INVENTION

This invention relates to the field of head suspension assemblies for computer disk drives, particularly suspension assemblies having two parts that are not readily weldable together, such as an actuator arm of a first material for mounting a load beam of a second material dissimilar to the first material such that the first and second material are not readily weldable together.

BACKGROUND OF THE INVENTION

In the past, it has been found desirable to use a laser to weld components together in the construction of a head suspension assembly for a computer disk drive. Such components include, but are not limited to load beams and actuator arms. This has not presented a problem when both components are made of the same or similar material, such as stainless steel, for which an ND: YAG type laser has been found suitable. However, when one component (such as the actuator arm) is made of a material (such as aluminum) that is not readily weldable to another component of a different material to which it must be attached (such as a stainless steel load beam) other means of attachment have been indicated. One reason for using dissimilar materials is to increase the ratio of stiffness to mass in one of the parts, for example, the actuator arm. However, moving away from existing laser welding technology increases the investment needed in manufacturing equipment as to cost, space and process flow, compared to present day manufacturing. The present invention overcomes this difficulty and, in one aspect, allows the use of existing laser welding technology by providing weldable inserts in one (or both) components when formed of material that is not easily weldable, thereby allowing such conventional welding to be used to secure parts or components such as the load beam and actuator arm together. As used herein, the phrase "unsuitable for welding" and the like refers to incompatibility of materials for purposes of joining together using a conventional laser welding technique. For example, joining aluminum to aluminum by specialized welding is known, but joining aluminum to steel is not readily accomplished using conventional welding techniques, and such a proposed metallurgical combination is to be understood as being "unsuitable for welding." Even though there are known techniques for joining dissimilar metals, such as ultrasonic energy welding and even explosive welding, such exotic techniques are not cost effective for the joining of components of head suspension assemblies. As such, the present invention responds to the need for a technique to enable laser welding to join dissimilar metals, to join a metallic component to a non-metallic component, and even to join non metallic components together for head suspension assemblies.

DETAILED DESCRIPTION OF THE INVENTION

Figure 1:
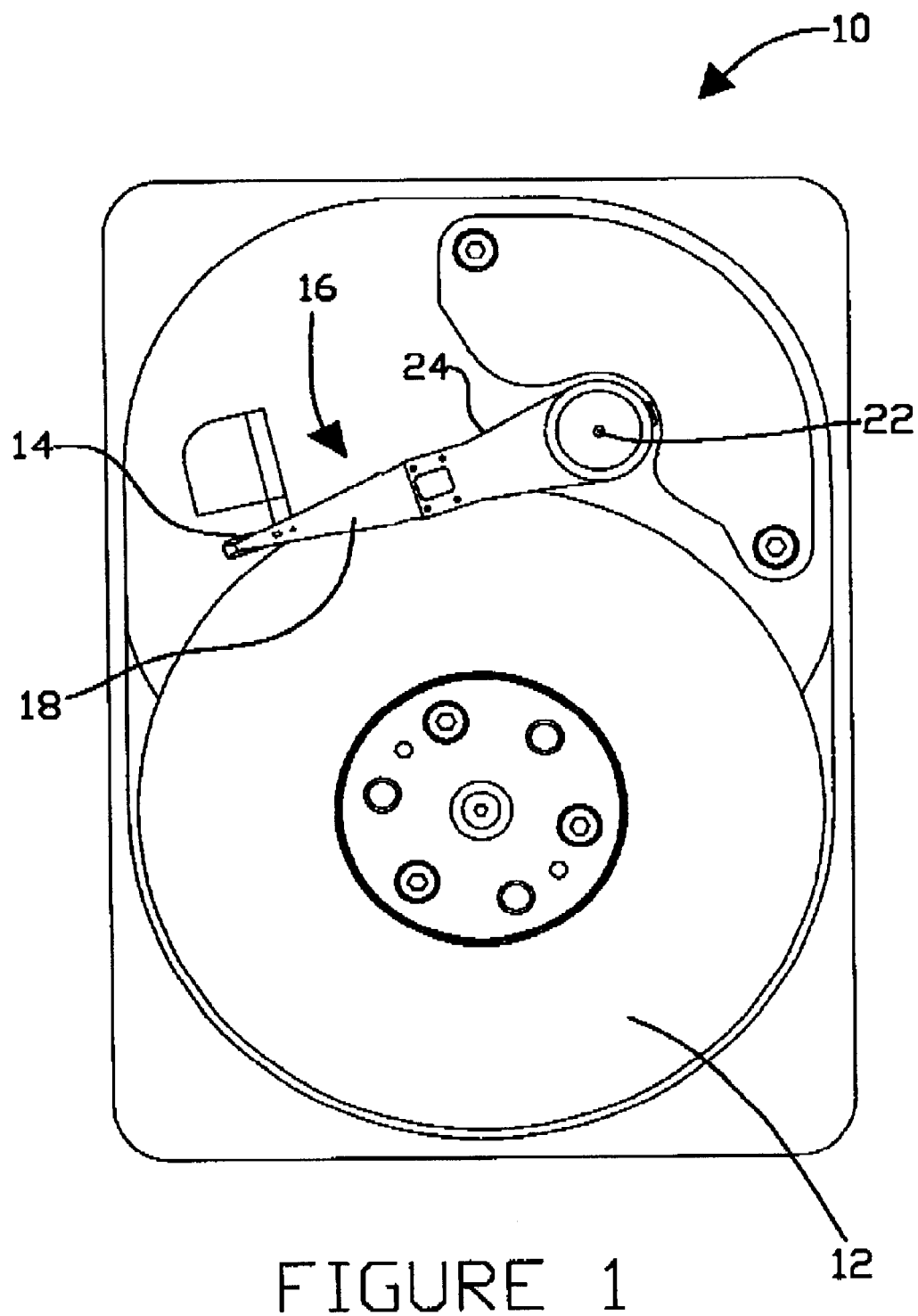
FIG. 1 is a top plan view of a computer disk drive assembly showing a head suspension with a load beam mounted on an actuator arm using the present invention.

Referring now to the figures, and most particularly FIG. 1, a disk drive 10 may be seen. Drive 10 has a rotatable magnetic disk 12 and a read/write head 14 mounted on a head suspension assembly 16 to read data from and write data to the disk 12. Suspension assembly 16 typically has a first component, such as a load beam 18 (typically formed of stainless steel) mounted to a second component, here an actuator arm 24, which is pivotable about an axis 22. In the prior art, such attachment of the load beam 18 to the actuator arm 24 was readily accomplished because both the load beam and actuator arm were made of the same, or at least, compatible materials, both suitable for direct welding therebetween. As shown in FIG. 1, actuator arm 24 is formed of a material unsuitable for welding, such as aluminum, with arm 24 attached to the load beam 18 using weld pads according to the present invention. It is also to be understood that the present invention is applicable to structures wherein both parts to be attached together are formed of material unsuitable for welding, in which case each of the two parts may contain the weld pads of the present invention to enable the parts to be welded together.

In the development of head suspensions, there have been efforts to pursue alternative actuator arm materials to obtain higher ratios of stiffness to mass to increase the performance of such products. However, alternative materials for such components are often not readily directly weldable together, for example, when the actuator arm is formed of aluminum and the load beam is stainless steel. In one embodiment, the present invention permits the use of materials other than steel for the actuator arm, while still permitting a welding attachment between the actuator arm and the load beam of the head suspension. In a preferred form, stainless steel pads are pressed into corresponding apertures in an actuator made of a material unsuitable for welding. It is to be understood that such materials include other metals such as aluminum, and non-metals such as polymers, ceramics and composites. Providing such weldable inserts in the actuator arm enables continued use of existing welding equipment as designs for head suspensions progress to actuator arm materials unsuitable for welding. As has been stated, either or both of the components to be secured together may be formed of material(s) not suitable for welding, and the present invention is carried out by providing weldable inserts in apertures in each of the components formed of material unsuitable for welding. Ordinarily, if one component is formed of weldable material, there is no need for weldable inserts to be installed in that component, since it is weldable directly. It is to be understood that the term "aperture" as used herein means a hole extending entirely or partially through the component of appropriate cross section configuration and depth dimension to receive and retain an appropriately shaped and sized insert.

Figure 2:
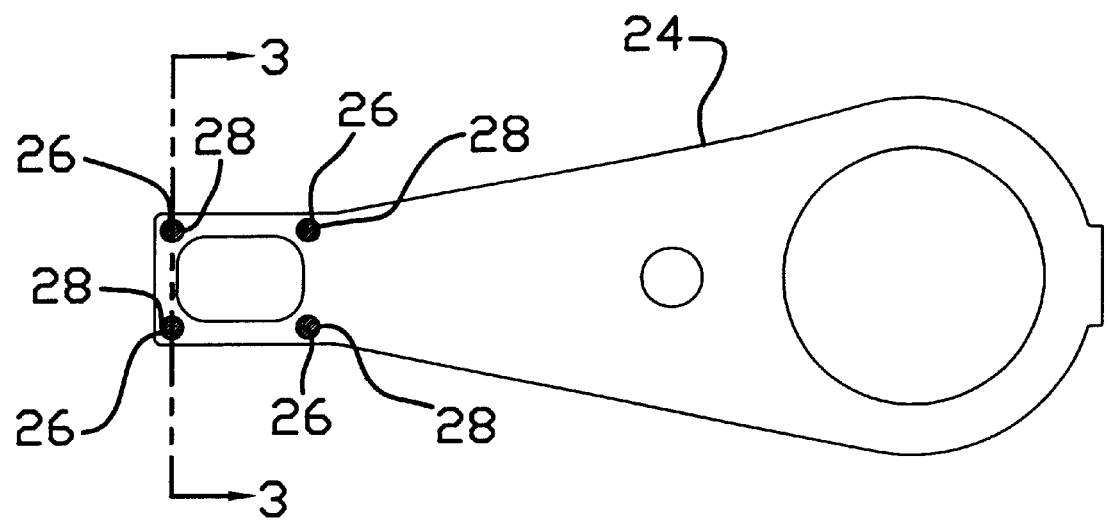
FIG. 2 is a plan view of an alternative actuator arm having weld pads useful in the practice of the present invention.
Figure 3A:
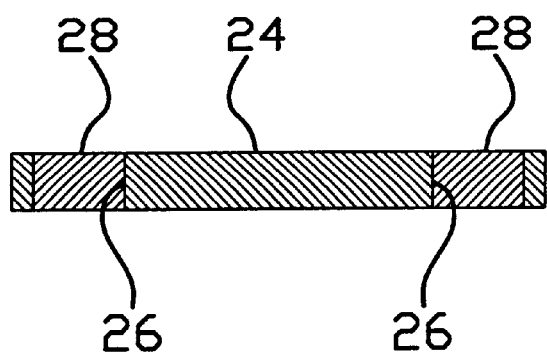
FIG. 3a is an enlarged end section view taken along line 3—3 of FIG. 2.

Referring now to FIGS. 2 and 3a, more details of the actuator arm 24 and weldable inserts of the present invention may be seen. Arm 24 is generally planar and has a plurality of apertures 26 therein. In one embodiment, arm 24 is formed of aluminum. The arm 24 is preferably 0.012 inches thick, however, it is to be understood that the present invention is applicable to a range of thicknesses from about 0.004 to about 0.050 inches. It is to be further understood that the present invention is not limited to aluminum for the material in which weld pads are inserted. Any suitable material, for example, polymer, ceramic, composites and other metals are within the scope of the present invention, provided a weld pad can be securely connected to the base material, for example, by ultrasonic bonding, thermal attachment, mechanical interference or chemical adhesion, further provided that the mechanical connection between the weld pad and base material to which it is connected is not adversely affected by subsequent welding of another component to the pad.

In the preferred practice of the present invention, each aperture 26 intended for component attachment contains an insert 28, which is preferably formed of stainless steel. The arm may have other apertures present for other purposes, such as to reduce mass or for alignment during assembly of the head suspension, or to provide clearance for other parts. As shown in FIGS. 2 and 3, inserts 28 are each retained in a respective aperture 26 by an interference fit between the insert and aperture containing the insert. Details of such an interference fit may be seen by reference to FIG. 7, described infra.

Figure 3B:
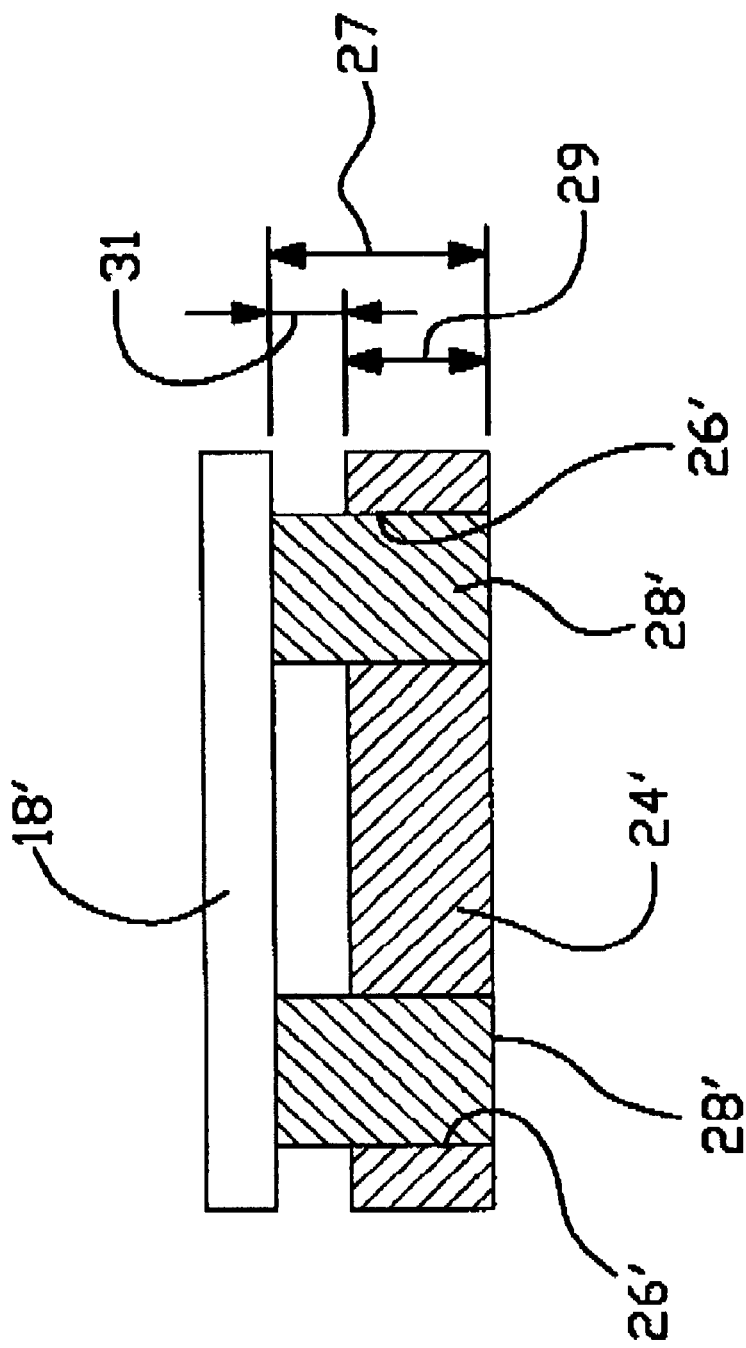
FIG. 3b is a view similar to that of FIG. 3a, except showing a further alternative embodiment including a load beam and with weld pads thicker than the actuator arm.

Referring now to FIG. 3b, in an alternative embodiment, a pair of weld pads 28' may be seen installed in respective apertures 26' an actuator arm 24.' In this embodiment, each weld pad has a thickness 27 greater than a thickness 29 of the arm 24.' A load beam 18' secured to weld pads 28' will be spaced from the actuator arm 24' in this embodiment by a gap 31 equal to the difference between the thickness 27 of the weld pads 28' and the thickness 29 of the actuator arm 24.' The structure shown in FIG. 3b forms a construction wherein the first and second components serve as structural members that are both connected together and spaced apart from each other by the weldable inserts 28'. In this aspect of the present invention, the weld pads 28' space the first and second components apart from each other, with the weld pads spaced laterally or transversely from each other, preferably near the edges of the second component (here the actuator arm 24').

Figure 4:
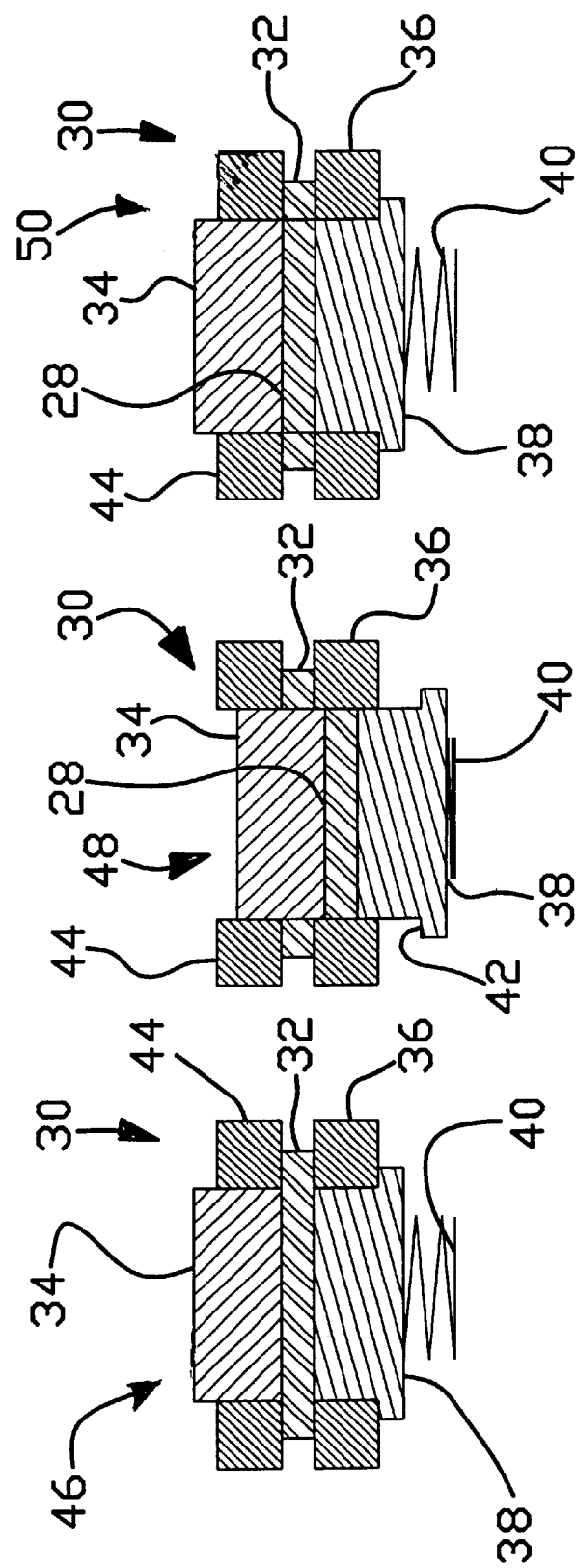
FIG. 4 is a set of three views of a punching operation useful in the practice of the present invention.

Referring now to FIG. 4, one method of practicing the method of forming and installing the inserts according to the present invention may be seen. In FIG. 4, a punch and die set or apparatus 30 is shown in three conditions, illustrating the steps in forming the insert 28 from a strip 32 and returning the insert 28 to the strip 32 from which it was punched, to use the strip 32 as a carrier for the insert 28 after it has been punched, and before it is inserted in an actuator arm. Apparatus 30 has a punch 34 and a die 36. A pressure pad 38 and spring 40 are positioned below the strip 32, and act to return the insert to the strip when the punch is withdrawn. A stop 42 may be provided to limit the upward travel of pressure pad 38. A combined clamp and punch guide 44 may be provided to clamp strip 32 and to guide punch 34 during operation of the apparatus 30. In a first position 46 the apparatus 30 is shown with the strip 32 clamped therein, ready for punching an insert. In a second position 48, the apparatus 30 is shown with the punch 34 advanced, forming an insert 28 from the strip 32. In this position, the insert is located in the die 36. In a third position 50, the apparatus 30 is shown with the punch 34 retracted with the insert 28 returned to the strip 32 by the spring 40 acting on the pressure pad 38. It is to be understood that the punch (and clamp 44) may be retracted away from the insert and strip if desired, without disturbing the location of the insert in the strip because stop 42 limits the pressure pad 38 from advancing the insert beyond that shown in position 50.

Figure 5:
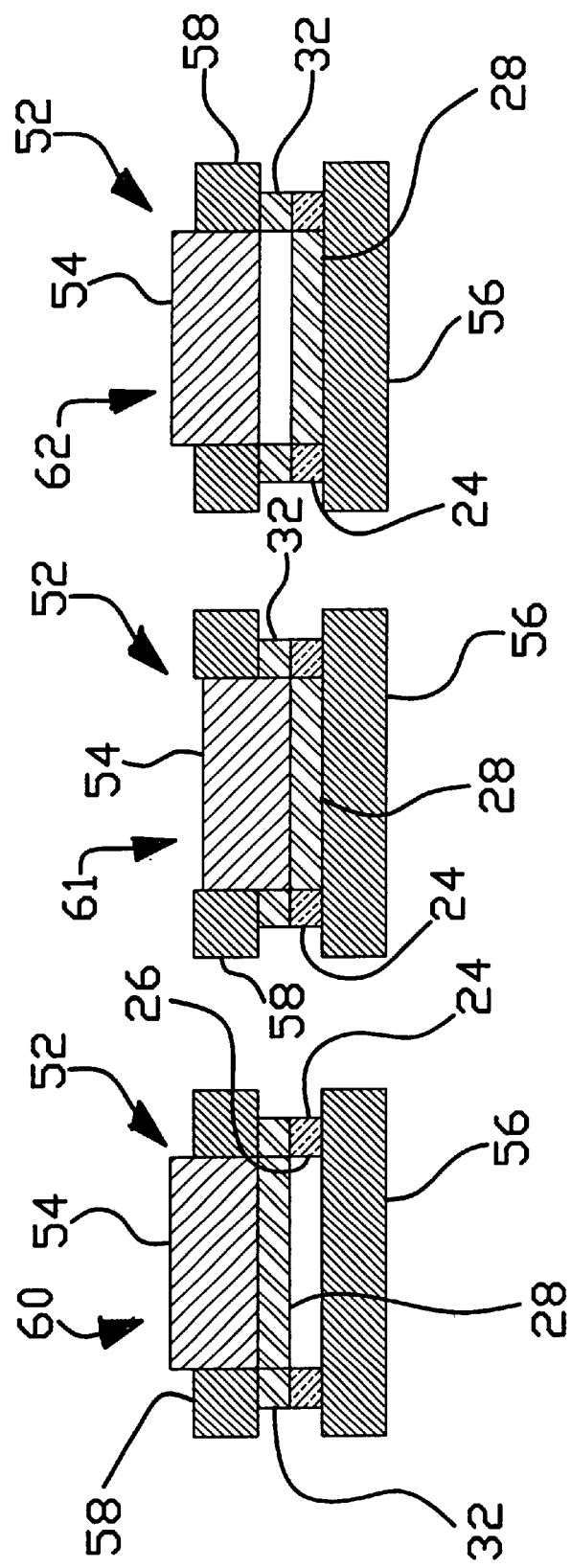
FIG. 5 is a set of three views of an installing operation useful in the practice of the present invention.

Referring now most particularly to FIG. 5, a mechanical press apparatus 52 is shown. It is to be understood that the punch and die apparatus 30 may also serve as the press apparatus 52, if desired. In the press apparatus 52, a ram 54 drives the insert 28 out of the carrier strip 32 and into the aperture 26 of the actuator arm 24. The actuator arm 24 is supported by an anvil 56, and may be retained, along with the strip 32, by clamps 58. In a first position 60, the press apparatus 52 is in an initial state, with the ram 54 ready to move the insert 28 from the carrier strip 32 to the aperture 26 in the actuator arm 24, where the arm 24 is supported by the anvil 56. In the second position 61, the press apparatus 52 is in an intermediate state with the ram 54 advanced showing the insert 28 pressed into the aperture 26 in the actuator arm 24. In the third position 62, the ram 54 is retracted, allowing the strip 32 and actuator arm to be removed from the press apparatus, once the clamps 58 are released. It is to be understood that even though only one insert 28 is shown in FIGS. 4 and 5, multiple inserts may be processed at the same time, if desired. This method of preparing an actuator arm of a disk drive head suspension for attachment by welding to a load beam, includes the steps of:

1. forming an aperture in an actuator arm of a first material unsuitable for welding (such as aluminum);
2. forming an insert in a strip of a second material (such as stainless steel) by punching the insert from the strip and returning the insert to the strip to carry the insert;
3. aligning the aperture in the actuator arm with a ram in a press apparatus with the actuator arm adjacent an anvil;
4. aligning the insert with the ram in the press apparatus; and
5. pressing the insert into the aperture in the actuator arm using the ram such that the insert is permanently retained in the actuator arm in a position to be welded to a load beam. This method may optionally include a further additional step of:

6. coining the insert to enhance retention of the insert in the aperture. It is to be understood that inserts may be bowl fed, carrier band fed, cassette fed or otherwise delivered to the ram, as desired, while still remaining within the scope of the present invention.

It is to be understood that in the practice of the present invention, the apertures may be formed by various means, including, but not limited to, stamping, wire EDM, laser cutting, and machining.

Figure 6:
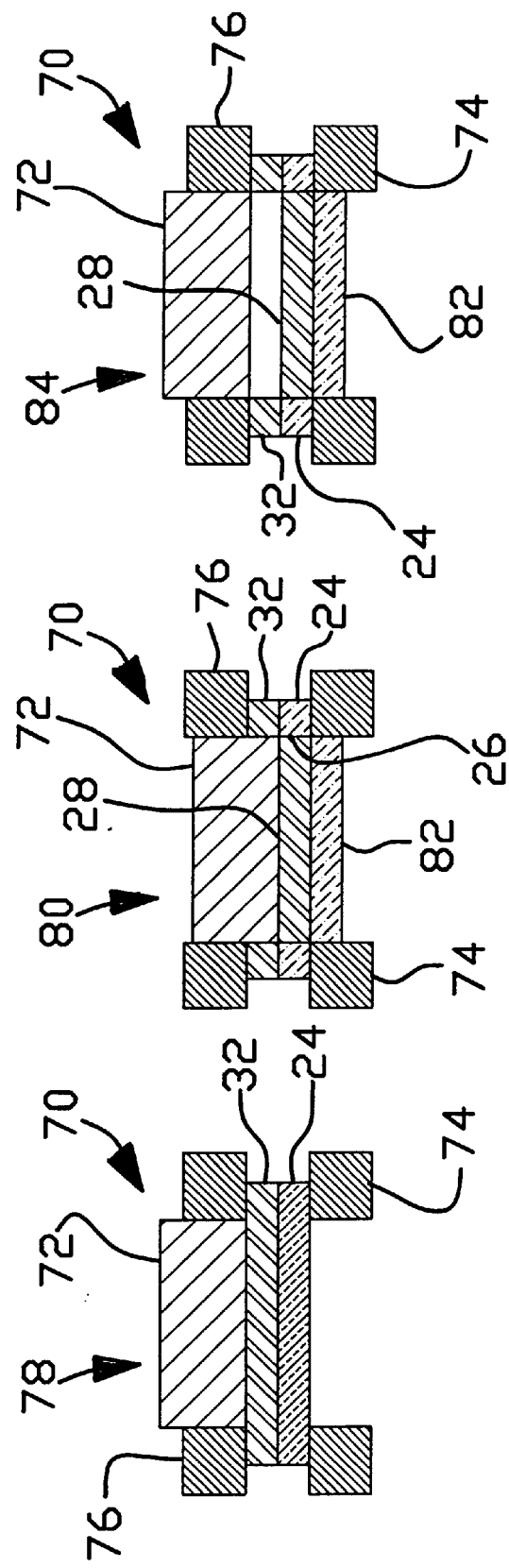
FIG. 6 is a set of three views of a combined punching and installing operation useful in the practice of the present invention.

Referring now to FIG. 6, an alternative method of practicing the present invention may be seen. A combined punch and press apparatus 70 has a punch 72, a die 74, and a clamp 76. The unpunched strip 32 and unapertured actuator arm 24 are held in apparatus 70 by clamps 76 in a first position 78 wherein the punch 72 and die 74 are aligned with a desired location for the aperture 26 in arm 24. The punch 72 is then advanced into and through the strip 32, severing an insert 28 from the strip 32 and delivering the insert 28 in an interference fit into the aperture 26 formed in the actuator arm 24 by the insert 28, as shown in a second position 80 of the apparatus 70. In the process, a core 82 is removed from arm 24. In position 84, the punch 72 is retracted, allowing removal of the strip 32 and actuator arm 24, after release of clamps 76. This method thus includes preparing an actuator arm of a disk drive head suspension formed of a material unsuitable for welding for attachment to a load beam by welding according to the following steps:

1. forming an actuator arm of a first material, preferably aluminum;
2. inserting the actuator arm into a punch and die apparatus such that a desired location of an aperture in the actuator arm is aligned with the punch and adjacent the die, where the actuator arm is preferably inserted transverse to a direction of advance of the punch;
3. moving a strip of a second material harder than the first material between the actuator arm and the punch, where the strip is preferably moved transverse to the direction of advance of the punch, and the second material is preferably steel (which may be fully hardened or annealed);
4. advancing the punch into the strip of the second material to remove an insert formed of the second material coextensive with a cross-section of the punch;
5. urging the insert of the second material into the actuator arm with the punch while simultaneously moving a corresponding insert of the first material from the actuator arm into the die such that an aperture is formed in the actuator arm and the insert is located in the aperture in a single stroke of the punch; and
6. withdrawing the punch to allow removal of the actuator arm from the punch and die apparatus.

Optionally, the method can include coining a slightly thicker insert, preferably of annealed steel, to expand the insert and fill in around the edges of the aperture to more securely lock the insert to the actuator arm. It is also to be understood that step 2 can be performed in the same apparatus used in step 1. Although described with respect to an actuator arm, the method and structure of the present invention is applicable to other components of a disk drive head suspension assembly.

Figure 7:
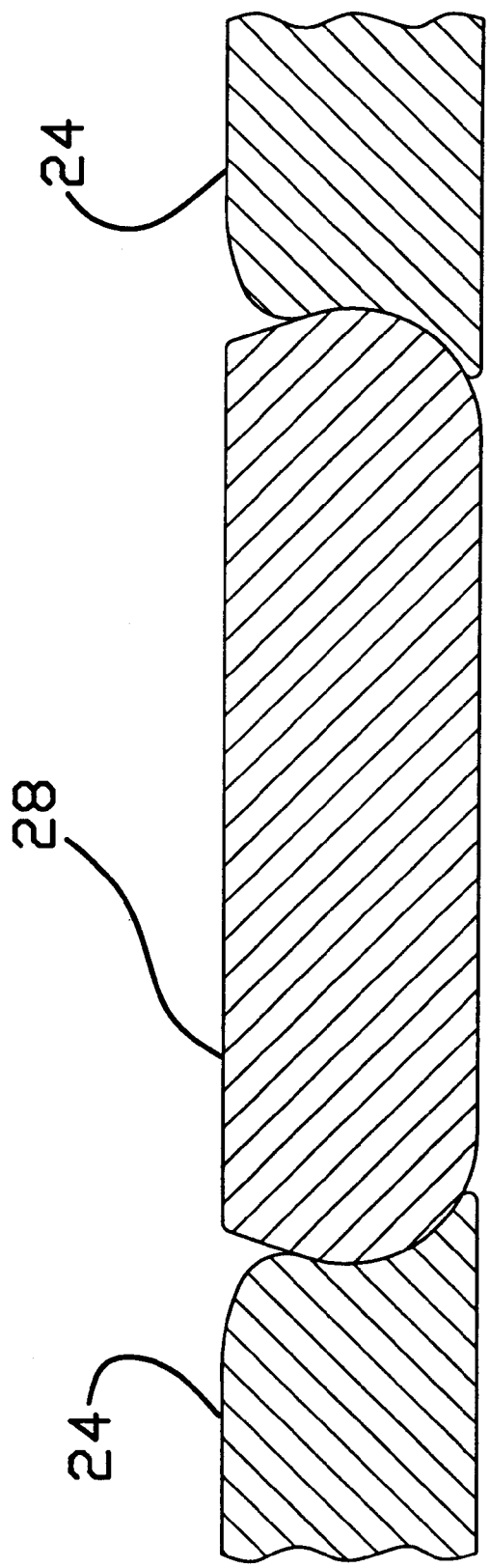
FIG. 7 is an enlarged view of a drawing of a cross-sectioned weld pad in an aperture corresponding to a result obtained using the method of the present invention shown in FIG. 6.

Referring now to FIG. 7, an enlarged view of the insert or weld pad 28 in the actuator arm 24 (in cross section) illustrates the result that may be obtained using the method of the present invention of FIG. 6. In comparison to FIG. 3 (which is a somewhat idealized or schematic representation) the result of the method of FIG. 6 is that a deformation of the interface between the insert 28 and the actuator arm 24 occurs when the insert is formed of material harder than that of the arm 24. The deformation results in locking the insert into the arm, it being understood that there is an interference fit between the insert 28 and the aperture in arm 24. In FIG. 7, the insert is 305 annealed stainless steel having a thickness of 0.012 inches and diameter of 0.031 inches. The aperture preferably has a diameter of 0.031 inches and is formed in an actuator arm formed of 5182 HI19 aluminum having a thickness of 0.012 inches.

Figure 9:
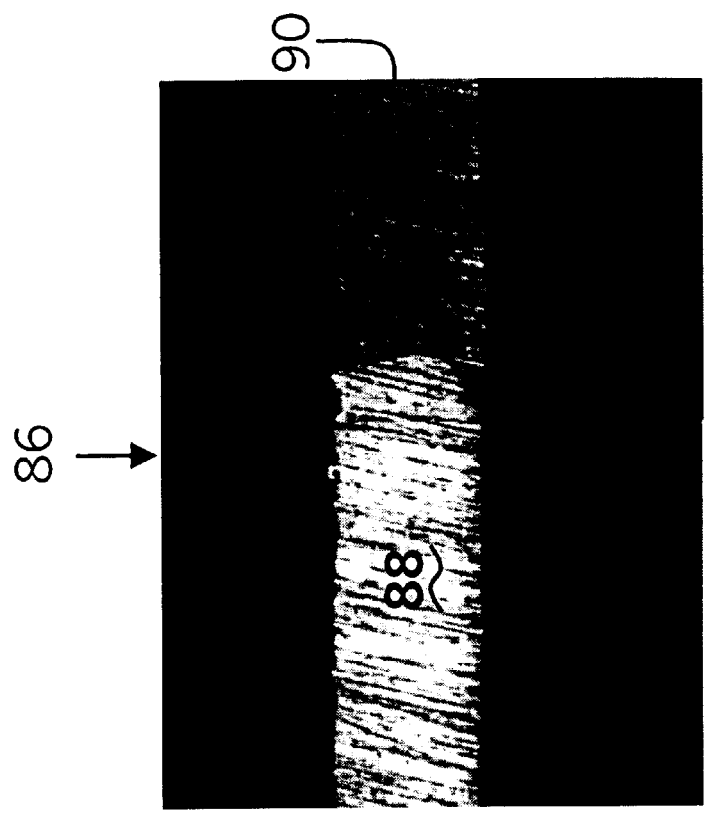
FIG. 9 is a microphotograph of a cross-sectioned weld pad of the right hand side of the plug of FIG. 8.
Figure 8:
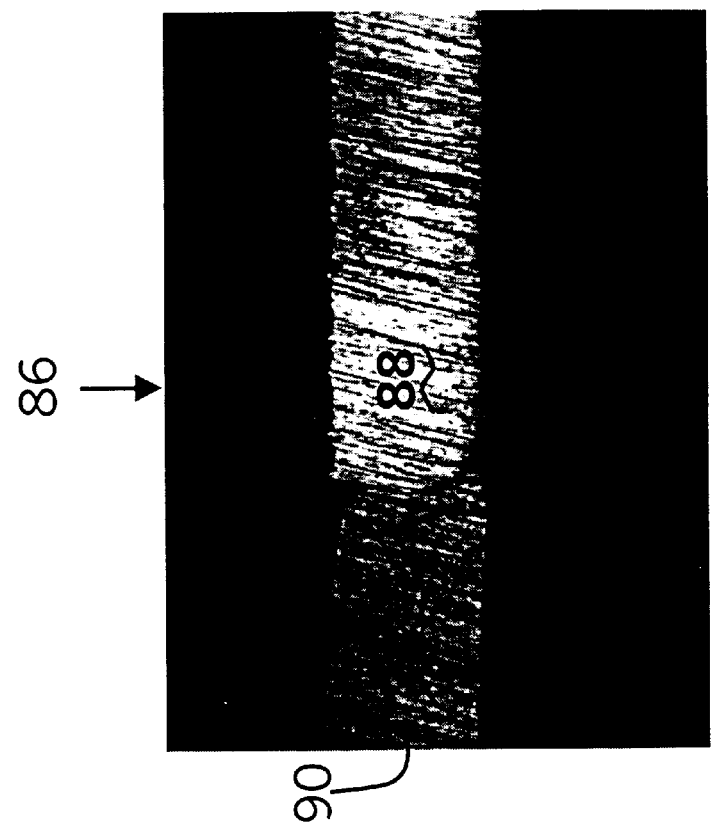
FIG. 8 is a microphotograph of a cross-sectioned weld pad of the left hand side of a 0.031 inch diameter, 0.012 inch thick fully hardened stainless steel plug lodged into a 0.012 inch thick aluminum strip according to the present invention.
Figure 11:
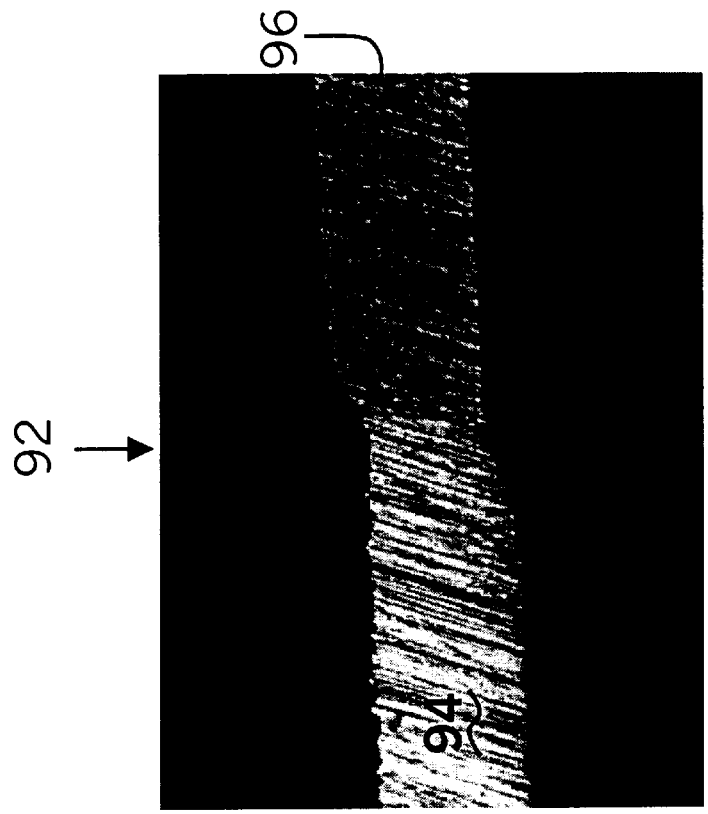
FIG. 11 is a microphotograph of a cross-sectioned weld pad of a right hand side of the plug of FIG. 10.
Figure 10:
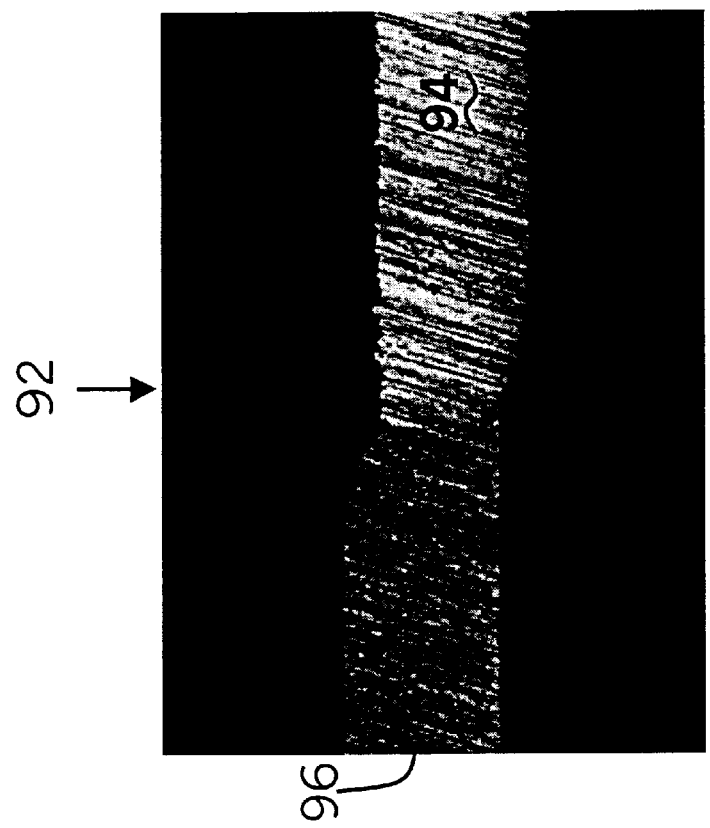
FIG. 10 is a microphotograph of a cross-sectioned weld pad of the left hand side of a 0.012 inch thick annealed stainless steel plug punched into a 0.012 inch thick aluminum layer according to the present invention.

Referring now to FIGS. 8, 9, 10 and 11, views of joints between the insert and surrounding material of the actuator arm may be seen. In FIGS. 8 and 9, left and right hand sides of an insert joint 86 may be seen for a fully hardened stainless steel insert 88 of 0.031 inch diameter and 0.012 inch thickness in a 0.012 inch thick aluminum plate 90 representing the actuator arm 24. In FIGS. 10 and 11, left and right hand sides of an insert joint 92 may be seen for an annealed stainless steel insert 94 of 0.031 inch diameter and 0.012 inch thickness in a 0.012 inch thick aluminum plate 96 representing the actuator arm 24.

The insert or metal plug may be coined after insertion into the aperture to further secure the plug to the actuator arm.

Figure 12:
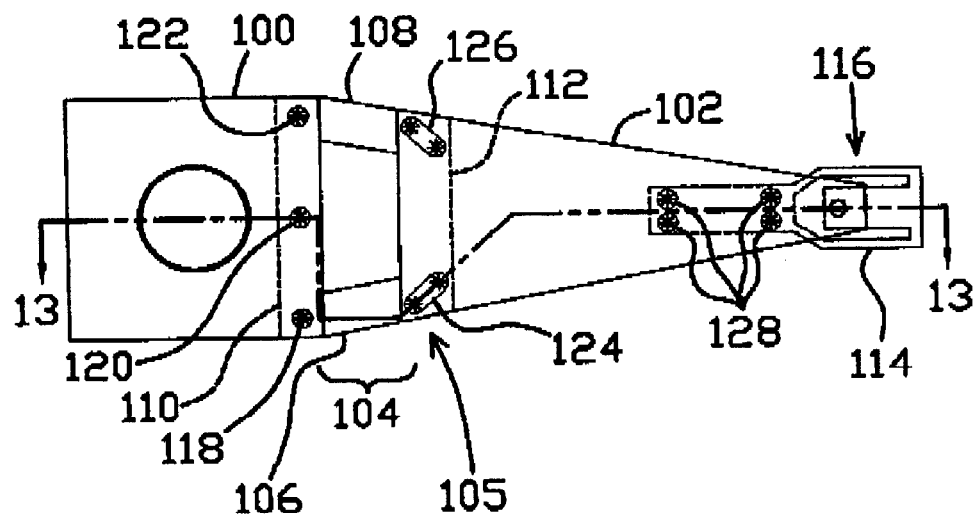
FIG. 12 is a plan view of a head suspension assembly illustrating applications of the present invention.
Figure 13:
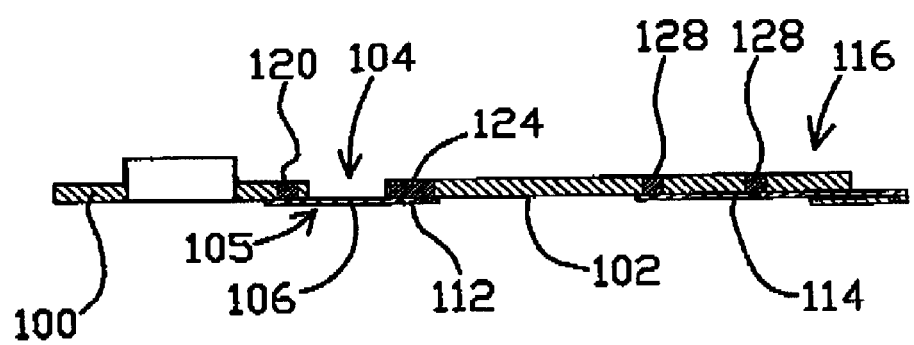
FIG. 13 is a section view taken along line 13—13 of the head suspension assembly of FIG. 12.

Referring now to FIGS. 12 and 13, the present invention may be used in connection with various components of a head suspension assembly. In the embodiment shown in these figures, an aluminum base plate 100 is attached to an aluminum load beam 102 via a spring region 104 having a stainless steel spring part 105 with a pair of stainless steel strips 106, 108 extending between transverse sections 110, 112 of the part 105 to provide the spring action and acting as a hinge between the base plate and the load beam. A stainless steel gimbal or flexure 114 is attached to the distal end 116 of load beam 102. In this embodiment, the present invention is used to attach the base plate 100 to the spring part 105 using plugs 118, 120, and 122 which are press fitted into base plate 100. Welds are indicated by the star or asterisk present in the respective plugs. Spring part 105 is attached to the aluminum load beam 102 by a pair of plugs 124, 126, which in this instance may be seen to be non circular. Plugs 124 and 126 are generally oval shaped in cross section. It is to be understood that, as used in this application, the term "plug" does not connote any particular cross-section. Furthermore, as indicated with respect to plugs 124 and 126, each plug may include more than one weld. Moving to the distal end of the head suspension assembly, four right circular cylindrical plugs 128 are preferably used to attach a stainless steel gimbal 114 to the aluminum load beam 102.

It is to be understood that the arrangement shown in FIGS. 12 and 13 are adaptable to a variety of materials to be joined with the weldable inserts of the present invention. For example, and not by way of limitation, the actuator arm, base plate and load beam may each be made of one or more of the following materials in the practice of the present invention, when used with weldable inserts: aluminum and aluminum alloys, ceramics, polymers, and composites. It is to be understood that materials other than those mentioned are also within the scope of the present invention, provided that they are able to carry weldable inserts. When the weldable inserts are used in a polymer or composite part, it is to be understood that the thermal mass of the insert is preferably designed to be sufficient to avoid raising the temperature of the insert (as a result of the welding operation) above a level that would adversely affect the mechanical bond between the insert and part.

Figure 14:
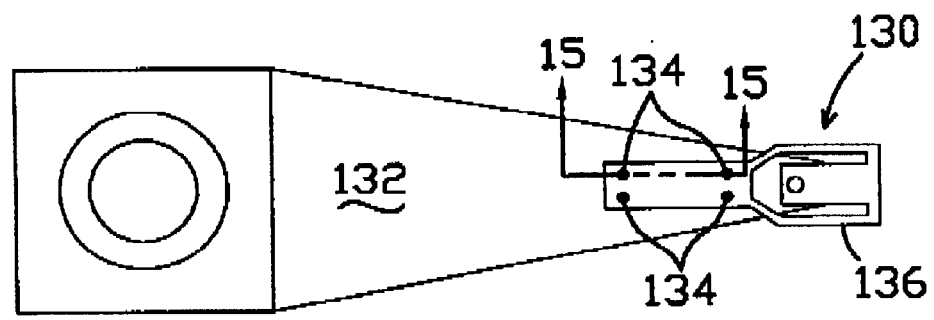
FIG. 14 is a plan view of an alternative embodiment of the present invention wherein the weld pads joining a flexure to a load beam simultaneously provide spacing for the flexure.
Figure 15:
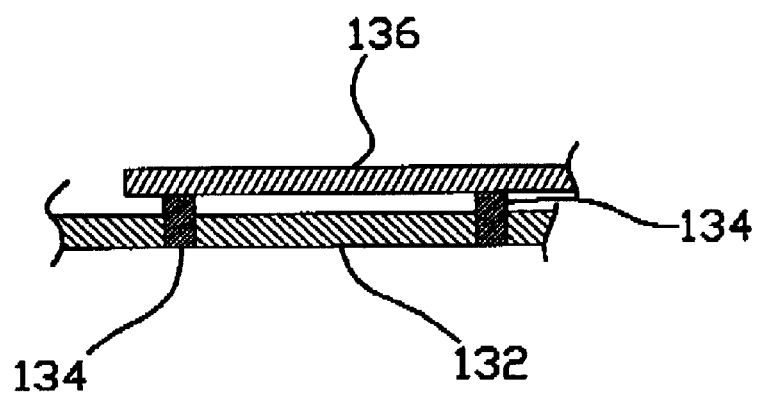
FIG. 15 is a fragmentary section view of the embodiment of FIG. 14, taken along line 15—15.

Referring now to FIGS. 14 and 15, an alternative embodiment of the present invention may be seen. In this embodiment, a head suspension assembly 130 is formed with a load beam 132 of material unsuitable for welding, but having inserts 134 for welding attachment to a flexure 136, preferably formed of stainless steel or another weldable material. As may be seen most clearly in FIG. 15, the weld pad inserts 134 space the flexure 136 away from the load beam 132 in this embodiment.

Figure 16:
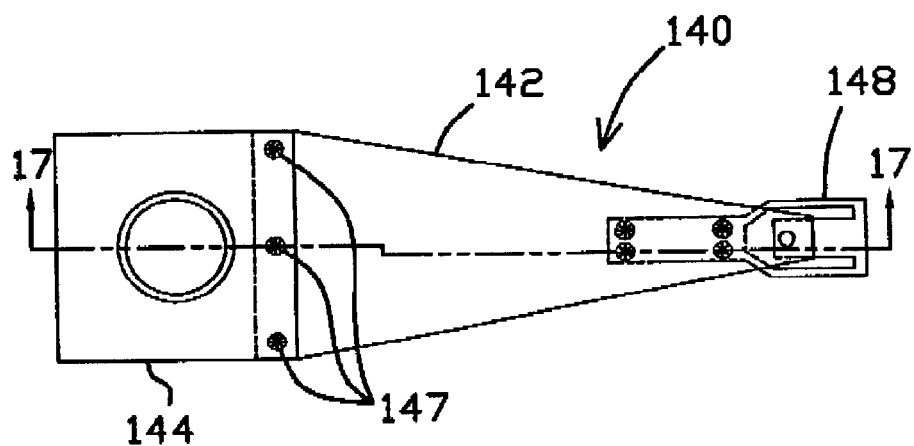
FIG. 16 is a plan view of a further alternative embodiment of the present invention utilizing a polymer base plate and a polymer load beam without an intervening metal spring region.
Figure 17:
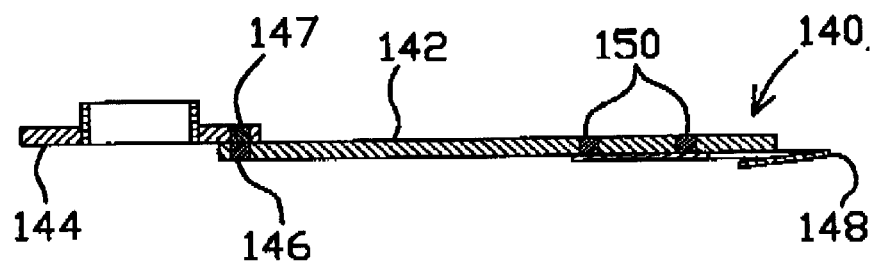
FIG. 17 is a side section view of the embodiment of FIG. 16, taken along line 17—17.

Referring now to FIGS. 16 and 17 a still further embodiment in the form of a head suspension assembly 140 may be seen in which a load beam 142 and a base plate 144 are each made of a polymer. As used herein, it is to be understood that the term "polymer" includes materials that have plastic properties, and preferably includes engineered plastic materials. Alternatively, a composite material may be used in place of the polymer. In this embodiment, it is to be noted that there is no separate spring region, with the load beam 142 joined to the base plate 144 directly with a plurality of weldable inserts 146, 147, with inserts 146 located in the load beam 142 aligned with inserts 147 located in the base plate 144. It is contemplated that the base plate 144 and the load beam 142 are formed of different polymers in this embodiment. Preferably a stainless steel flexure 148 is joined to the load beam 142 by weldable inserts 150. To manufacture head suspension assembly 140, the individual components are formed, with a plurality of like components, such as the load beam 142 located in a strip carrier. The weldable inserts are then press fit or otherwise secured in the individual components in the strip, and unlike components, such as the load beam 142 and base plate 144 are then aligned and welded together through weld pads or inserts 146, 147. A similar process is performed for attaching the flexure 148 to the load beam 142, although no inserts are required when the flexure is made of weldable material. At least one of the parts is severed from its respective strip either before or after welding occurs, and the head suspension assembly 140 itself is eventually removed from its carrier prior to further installation into a disk drive assembly.

The method of the present invention encompasses joining a first component, such as a load beam, to a second component, such as an actuator arm, in a disk drive head suspension assembly or subassembly. In one aspect, the method is carried out by forming a first component of metal suitable for welding (or inserting a metal plug in an aperture in the first component when the first component is formed of a material not suitable for welding), inserting a metal plug into an aperture in a second component to be attached to the first component where the second component is formed of a material unsuitable for welding to the first component, and joining the first and second components together by welding at the one or two metal plugs. In another aspect, the present invention is carried out by joining two components formed of one or more materials not suitable for welding, in which case the metal plugs are inserted into apertures in each of the components, after which the components are joined together by welding at the metal plugs. Preferably each metal plug is inserted into its mounting aperture in an interference fit.

The apparatus of the present invention may thus be seen (in one aspect) to include a first component (such as a load beam) formed (or having inserts) of a material suitable for welding and a second component (such as an actuator arm) formed of a material having certain desirable properties, including stiffness and density, but which makes the second component unsuitable for welding to the first component. In another aspect, both components are formed of one or more materials unsuitable for welding, with weldable inserts inserted in each and then welded together. When the second component is an actuator arm, it has a proximal end for attachment to an actuator and a distal end having one or more apertures formed therein. One or more inserts are received in respective apertures formed of material suitable for welding to the first component (the load beam in this example), and a weld is formed between the load beam and the insert to secure the load beam to the actuator arm.

It may thus be seen that the present invention may be used to connect two components of a head suspension assembly where each component is formed of material unsuitable for welding, as well as attaching one component formed of weldable material to another component formed of material unsuitable for welding.

This invention is not to be taken as limited to all of the details thereof as modifications and variations thereof may be made without departing from the spirit or scope of the invention. Furthermore, it is to be understood that, unless expressly stated to the contrary, the steps of the present invention appearing in the method claims herein may be performed in another order or sequence, including but not limited to partial reordering and simultaneous performance, while still remaining within the scope of the claimed invention.

What is claimed is:

1. A method of joining a first component to a second component for a disk drive head suspension comprising the steps of:
   a. forming a first component of metal suitable for welding and forming a second component of material unsuitable for welding to the first component;
   b. inserting a metal plug into an aperture in the second component;
   c. coining the metal plug in the aperature; and
   d. joining the first component and the second component together by welding the first component to the metal plug in the second component.

2. The method of claim 1 wherein the metal plug is inserted into the aperture in an interference fit.

3. The method of claim 1 wherein the metal plug and the first component are each formed of stainless steel.

4. The method of claim 1 wherein the second component is formed of aluminum.

5. The method of claim 1 wherein the second component is formed of ceramic.

6. The method of claim 1 wherein the second component is formed of a polymer.

7. The method of claim 1 wherein the first component is a load beam.

8. The method of claim 7 wherein the second component is an actuator arm.

9. An improved subassembly for a disk drive head suspension assembly wherein a first component and a second component are formed of material unsuitable for welding together, the subassembly comprising:
   a. a first component of a disk drive head suspension formed of a first material and having an aperture formed therein
   b. a second component of a disk drive head suspension formed of a second material unsuitable for welding to the first material;
   c. an insert received in the aperture of the first component and formed of a material suitable for welding to the second material and coined after insertion in the aperture; and
   d. a weld formed between the second component and the insert to secure the first component to the second component.

10. The assembly of claim 9 wherein the first component is an actuator arm.

11. The assembly of claim 10 wherein the actuator arm is formed of aluminum.

12. The assembly of claim 9 wherein the second component is a load beam.

13. The assembly of claim 12 wherein the load beam is formed of stainless steel.

14. The assembly of claim 9 wherein the insert is secured in the aperture in an interference fit.

15. The assembly of claim 9 wherein the first component is a load beam.

16. The assembly of claim 15 wherein the second component is a flexure.

17. The assembly of claim 9 wherein the first component is a load beam.

18. The assembly of claim 17 wherein the second component is a hinge.

19. A method of preparing a component for a head suspension assembly formed of a material unsuitable for welding for attachment by welding, the method comprising:
   a. forming at least one component of a first material;
   b. inserting the component into a punch and die apparatus such that a desired location of an aperture in the component is aligned with the punch and adjacent the die;
   c. interposing a strip of a second material harder than the first material between the component and the punch;
   d. advancing the punch into the strip of the second material to remove an insert formed of the second material coextensive with a cross-section of the punch;
   e. urging the insert of the second material into the component with the punch while simultaneously moving a corresponding insert of the first material from the component into the die such that an aperture is formed in the component and the insert is located in the aperture in a single stroke of the punch; and
   f. withdrawing the punch to allow removal of the component from the punch and die apparatus.

20. The method of claim 19 wherein step b. includes moving the component transverse to a direction of advance of the punch.

21. The method of claim 19 wherein step c. includes moving the strip of the second material transverse to a direction of advance of the punch.

22. The method of claim 19 further comprising the additional step of:
   g. coining the insert to enhance retention of the insert in the aperture.

23. The method of claim 19 wherein the first material is aluminum.

24. The method of claim 19 wherein the first material is a polymer.

25. The method of claim 19 wherein the first material is a composite.

26. The method of claim 19 wherein the second material is steel.

27. The method of claim 26 wherein the steel is annealed.

28. The method of claim 26 wherein the steel is fully hardened.

29. The method of claim 26 wherein the steel is stainless steel.

30. A method of preparing a disk drive head suspension actuator arm unsuitable for welding for attachment by welding to a load beam, the method comprising:
   a. forming an aperture in an actuator arm of a first material unsuitable for welding;
   b. forming an insert in a strip of a second material by punching the insert from the strip and returning the insert to the strip to carry the insert;
   c. aligning the aperture in the actuator arm with a ram in a press apparatus with the actuator arm adjacent an anvil in the press apparatus;
   d. aligning the insert with the ram in the press apparatus; and
   e. pressing the insert into the aperture in the actuator arm using the ram such that the insert is permanently retained in the actuator arm in a position to be welded to a load beam.

31. The method of claim 30 further comprising the additional step of:
   f. coining the insert to enhance retention of the insert in the aperture.

32. The method of claim 30 wherein the first material is aluminum.

33. The method of claim 30 wherein the second material is stainless steel.

34. An improved subassembly for a disk drive head suspension assembly wherein at least one of a first component and a second component are formed of one or more materials unsuitable for joining together by welding, the subassembly comprising:
   a. a first component of a disk drive head suspension assembly formed of a first material and having a fat aperture formed therein;
   b. a second component of a disk drive head suspension assembly formed of a second material unsuitable for welding to the first material and having a second aperture formed therein;
   c. a first insert received in the first aperture and formed of a material suitable for welding;
   d. a second insert received in the second aperture and formed of a material suitable for welding; and
   d. a weld formed between the first and second inserts to secure the first component to the second component
wherein one of the first and second inserts has a thickness greater than a thickness of the component in which it is received.

35. A method of joining a first component to a second component for a disk drive head suspension comprising the steps of:
   a. forming a first component and a second component, with each formed of a material unsuitable for welding, wherein each component has an aperture therein;
   b. inserting a metal plug suitable for welding into each aperture; and
   c. joining the first component to the second component together by welding the metal plugs together.

36. An improved subassembly of at least two spaced-apart components for a disk drive head suspension assembly wherein at least one of the components is formed of a material unsuitable for welding to the other component, the subassembly comprising:
   a. a first component of a disk drive head suspension formed of a first material suitable for welding;
   b. a second component of a disk drive head suspension having a characteristic thickness and longitudinal and transverse dimensions and formed of a second material unsuitable for welding to the first material and having at least a pair of apertures formed therein and spaced apart from each other in the transverse dimension;
   c. a pair of inserts received in the spaced apart apertures and formed of a material suitable for welding, where the inserts have a thickness substantially greater than the characteristic thickness of the second component such that the inserts project out from the second component; and d. at least a pair of welds formed between each projecting insert and the first component to secure the first component to the second component in a spaced apart relationship.

37. A method of joining a first component to a second component for a disk drive head suspension assembly comprising the steps of:

a. forming a first component;

b. forming a second component with at least a pair of laterally spaced apart apertures therein;

b. inserting a pair of metal plugs suitable for welding into the respective laterally spaced apart apertures where the metal plugs have a thickness substantially greater than a thickness of the second component; and c. joining the first component to the second component together in a subassembly wherein the first and second components are spaced apart by the metal plugs extending out from the second component by welding the metal plugs to the first component.

38. A method of joining a first component for a second component for a disk drive head suspension comprising the steps of:

a. forming a first component of metal suitable for welding and forming a second component of a polymer material unsuitable for welding to the first component;

b. inserting a metal plug into an aperture in the second component;

c. joining the first component and the second component together by welding the first component to the metal plug in the second component.

39. The method of claim 38 wherein the metal plug is inserted into the aperture in an interference fit.

40. The method of claim 38 wherein the metal plug and the first component are each formed of stainless steel.

41. The method of claim 38 wherein the first component is a load beam.

42. The method of claim 41 wherein the second component is an actor arm.

43. An improved subassembly for a disk drive head suspension assembly, the subassembly comprising:

a. a load beam formed of a first material and having an aperture formed therein;

b. a flexure formed of a second material unsuitable for welding to the first material;

c. an insert received in the aperture of the load beam and formed of a material suitable for welding to the second material; and d. a weld formed between the flexure and the insert to secure the load beam to the flexure.

44. An improved subassembly for a disk drive head suspension assembly, the subassembly comprising:

a. a load beam formed of a first material and having an aperture formed therein;

b. a hinge formed of a second material unsuitable for welding to the first material;

c. an insert received in the aperture of the load beam and formed of a material suitable for welding to the second material; and d. a weld formed between the hinge and the insert to secure the load beam to the hinge.

* * * * *

UNITED STATES PATENT AND TRADEMARK OFFICE
CERTIFICATE OF CORRECTION

PATENT NO. : 6,870,708 B1
DATED : March 22, 2005
INVENTOR(S) : Fossum et al.

It is certified that error appears in the above-identified patent and that said Letters Patent is hereby corrected as shown below:

Column 8,
Line 34, delete "aperature" and insert -- aperture --

Column 10,
Line 27, delete "fat" and insert -- first --

Column 11,
Line 24, delete "for" and insert -- to --

Column 12,
Line 8, delete "actor" and insert -- actuator --

Signed and Sealed this

Twenty-first Day of June, 2005

JON W. DUDAS
*Director of the United States Patent and Trademark Office*